(12) United States Patent
Franczyk

(10) Patent No.: US 7,021,505 B2
(45) Date of Patent: Apr. 4, 2006

(54) DUAL USE DECORATING DEVICE

(75) Inventor: Catherine Franczyk, Woodridge, IL (US)

(73) Assignee: Wilton Industries, Inc., Woodridge, IL (US)

( * ) Notice: Subject to any disclaimer, the term of this patent is extended or adjusted under 35 U.S.C. 154(b) by 152 days.

(21) Appl. No.: 10/410,431

(22) Filed: Apr. 9, 2003

(65) Prior Publication Data
US 2004/0112915 A1  Jun. 17, 2004

Related U.S. Application Data

(60) Provisional application No. 60/432,802, filed on Dec. 12, 2002.

(51) Int. Cl.
B65D 47/10 (2006.01)

(52) U.S. Cl. .................................. 222/541.1

(58) Field of Classification Search .................. 222/1, 222/80, 81, 92, 107, 212, 541.1, 541.2, 541.5, 222/562, 566, 575; 99/345; 425/191, 461, 425/376.1; 426/512, 516, 517, 115, 81, 389; 220/256.1, 258.1, 258.3, 265, 267
See application file for complete search history.

(56) References Cited

U.S. PATENT DOCUMENTS

| 608,958 | A | 8/1898 | Ferraioli |
|---|---|---|---|
| 2,184,712 | A | 12/1939 | Fleissig |
| 2,320,496 | A | 6/1943 | Wechsler |
| 2,984,570 | A | 5/1961 | Prell |
| 3,016,173 | A * | 1/1962 | Stull ..................... 222/541.2 |
| 3,506,163 | A | 4/1970 | Rauh et al. |
| 3,690,524 | A | 9/1972 | Haberhauer |
| 3,847,523 | A | 11/1974 | Parrish et al. |
| 4,394,936 | A | 7/1983 | Shavit |
| 4,452,823 | A | 6/1984 | Connolly et al. |
| 4,493,439 | A | 1/1985 | Ledewitz |
| 4,574,987 | A | 3/1986 | Halligan et al. |
| 4,844,917 | A | 7/1989 | De Lorimiere |
| 4,961,517 | A | 10/1990 | Tkac |
| 5,104,013 | A * | 4/1992 | Hawley ..................... 222/566 |
| 5,361,946 | A | 11/1994 | Ginther et al. |
| 5,758,802 | A | 6/1998 | Wallays |
| 5,823,383 | A | 10/1998 | Hins |
| 5,931,346 | A | 8/1999 | Wallays |
| 6,000,848 | A | 12/1999 | Massioui |
| 6,065,651 | A * | 5/2000 | Tedeschi et al. ............ 222/519 |
| 6,153,238 | A | 11/2000 | Shannon |
| 6,273,307 | B1 | 8/2001 | Gross et al. |
| 6,386,395 | B1 | 5/2002 | Lunghetti |
| 6,439,429 | B1 | 8/2002 | Gross |

* cited by examiner

Primary Examiner—Philippe Derakshani
(74) Attorney, Agent, or Firm—DLA Piper Rudnick Gray Cary US LLP

(57) ABSTRACT

A container has an opening and a nozzle disposed within the opening. The nozzle has a sealed tip that extends from the opening. A cap having an opening therethrough is secured to the nozzle. To use the container, the tip of the nozzle is cut to enable a viscous fluid to dispense therefrom at a first thickness. When the cap is re-secured to the nozzle, the opening of the cap enables the viscous food substance to dispense therefrom at a second thickness that is less than the first thickness.

20 Claims, 3 Drawing Sheets

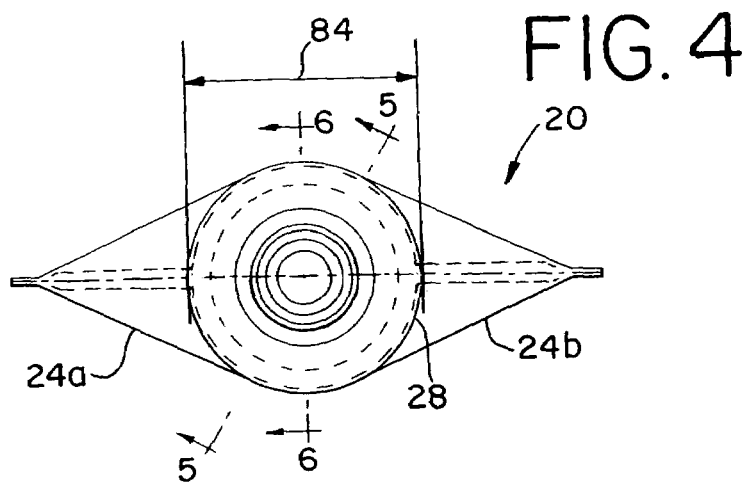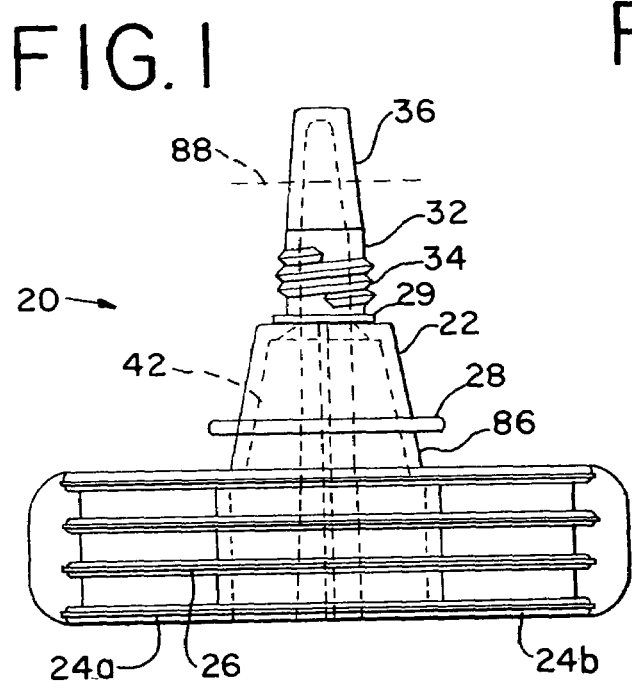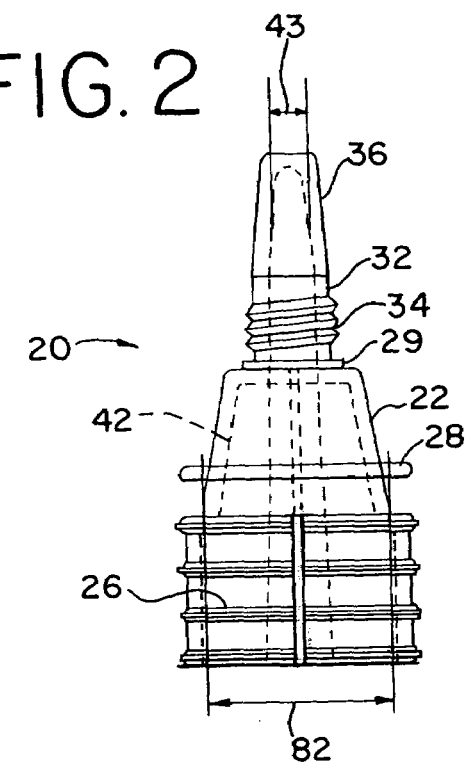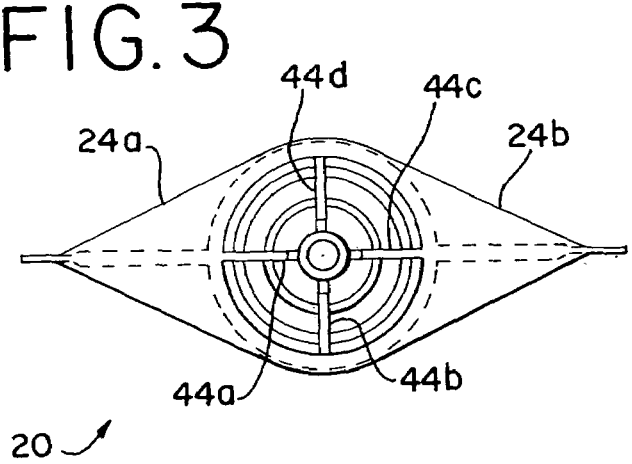

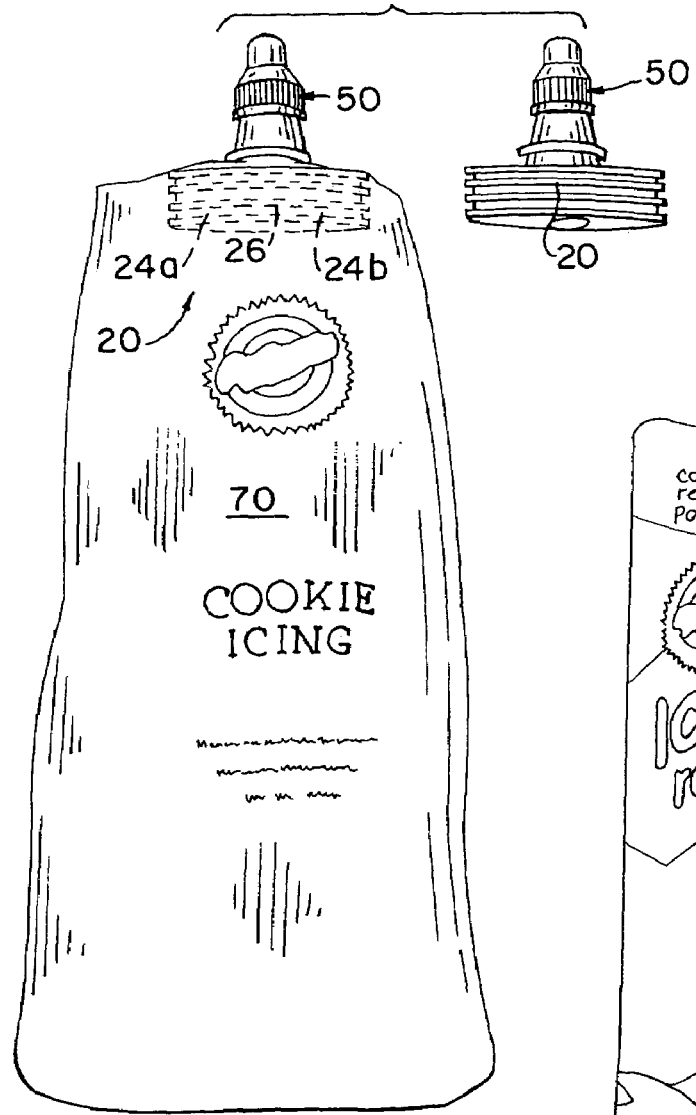
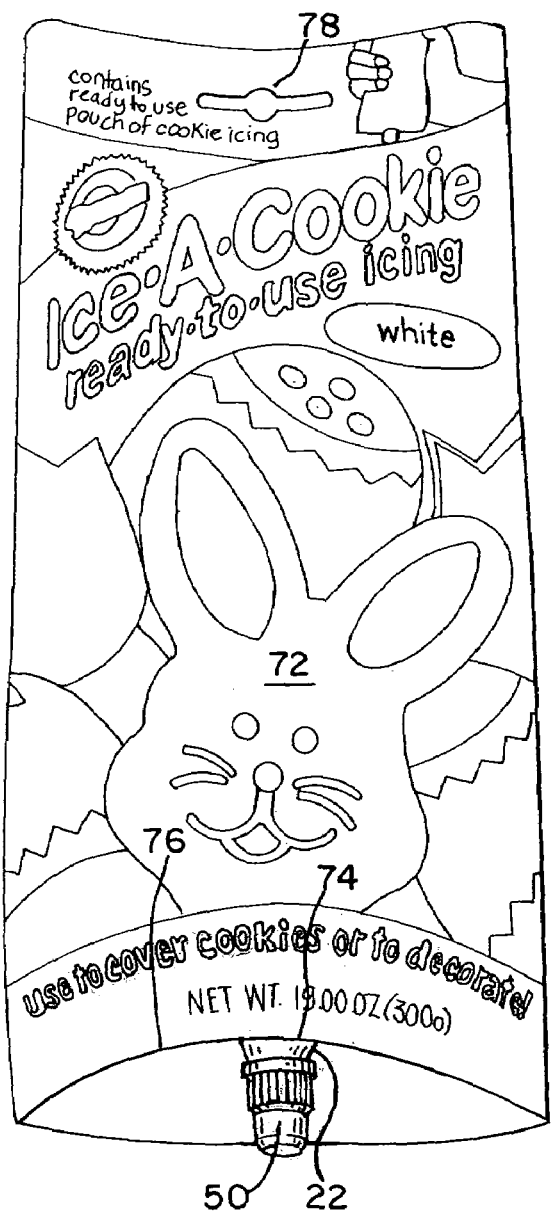

DUAL USE DECORATING DEVICE

CROSS REFERENCE TO RELATED APPLICATIONS

This application claims priority to U.S. Provisional Patent Application Ser. No. 60/432,802 filed on Dec. 12, 2002.

FIELD OF THE INVENTION

The present invention relates generally to hand held dispensers for viscous foodstuffs and, more particularly, to dispensers which may be used to dispense icing on deserts such as cookies, cakes and the like and tips, nozzles and caps for such dispensers.

BACKGROUND OF THE INVENTION

Methods of dispensing icing onto cakes, cookies or the like are well known. Traditionally, icing is placed into collapsible paper cones that may be squeezed to dispense the icing through the tip or nozzle at one end of the cone. An example of a collapsible cone is illustrated in U.S. Pat. No. 2,320,496 issued to Wechsler. The collapsible cones, however, may rupture or tear so as to leave the device inoperable.

As an alternative to the paper cones, icing may be dispensed using collapsible or squeezable bulb-shaped containers, such as the one illustrated in U.S. Pat. No. 5,758,802 issued to Wallays. The bulb-shaped containers may be reused; however, the containers must be cleaned after use.

Often, bakers avoid decorating their own deserts because of the trouble involved in making the decorating frosting in the small quantities and different colors desired. In addition, once the icing is made, it must be loaded into either the cone or the bulb-shaped container which may be a time-consuming and messy process.

In response to the above issues, pre-made icing that has been packaged in squeezable and disposable plastic tubes or pouches has become popular. The plastic tubes or pouches are permanently sealed on one end and feature a single opening on the other end which is sealed with a cap or the like prior to use.

The nozzles or tips of prior art devices feature a variety of arrangements for closing and dispensing the icing or other foodstuffs. For example, the device illustrated in U.S. Pat. No. 2,984,570 issued to Prell has a threaded neck surrounding its opening. A threaded cap engages the neck and seals the container when it is not in use. The container is prepared for use by removing the cap and replacing it with a threaded nozzle featuring an aperture having a desired shape or design. Once the cap is replaced with the nozzle, the icing may be dispensed.

A disadvantage of such an arrangement, however, is that the user only has a single option with regard to the aperture size or shape through which the icing is dispensed. For example, the user may desire to ice a portion of the desert with a base layer or sheet of icing and then form a pattern with a thin line of icing on top of the base layer. In addition, the nozzle is a separate piece that must be packaged with the capped container. This increases packaging cost and the user may lose the nozzle when storing the product. Unless the container is resealed, the cap is also a useless or wasted component once the container is opened. In other words, it is merely removed and tossed away.

Another arrangement for closing and dispensing the icing is illustrated with the bulb shaped container of the Wallays '802 patent. More specifically, the Wallays '802 patent shows a nozzle that screws into threads surrounding the container opening. The discharge end of the nozzle features an opening having a specific size and shape or pattern. The device also includes a cone-shaped cap for friction engagement over the nozzle. Once again, however, such an arrangement only provides the user with a single option in terms of an opening size and shape through which to dispense the icing. In addition, such an arrangement is not suitable for packaging pre-made icing as the cap could become dislodged from the nozzle. This would compromise the package sealing.

The concept of disposing other flowable food items from a container is also known. For example, U.S. Pat. No. 6,153,238 issued to Shannon shows a packaged decorator cheese product that includes a squeezable pouch from which the cheese is dispensed through a tip. The Shannon '238 patent shows another arrangement for closing and dispensing the icing wherein a nozzle is secured to the threaded neck surrounding the opening of a squeezable pouch by a threaded collar. The neck initially has a cap positioned thereon that is removed when dispensing is to take place. The nozzle, having a decorative opening, is positioned over the non-threaded portion of the neck. The collar features an opening through which the distal portion of the cone-shaped nozzle may pass. The collar is placed over the nozzle so that its threads engage those of the neck. The collar is then rotated so that the nozzle is secured in place. This arrangement, however, also only provides a single decorative opening and multiple pieces are required to install the nozzle. The cap also becomes a useless piece that is discarded after the package is opened.

Accordingly, the technical advantage of the present invention is to provide a dispensing and decorating device that provides increased flexibility and utility to an end user by allowing the end user to dispense a viscous material in varying thickness.

SUMMARY OF THE INVENTION

The present invention is directed to a container for dispensing a viscous fluid. The container includes an opening and a nozzle disposed within the opening. The nozzle has a sealed tip that extends outward from the opening in the container. A cap is secured to the nozzle. The cap has an opening therethrough. To use the container, the tip of the nozzle is cut to enable the viscous fluid to dispense therefrom at a first thickness. Additionally, when the cap is secured to the nozzle with the cut tip, the opening of the cap enables the viscous fluid to dispense therefrom at a second thickness less than the first thickness.

BRIEF DESCRIPTION OF THE DRAWINGS

Further aspects of the invention and their advantages may be discerned from the following description when taken in conjunction with the drawings, in which like characters number like parts and in which:

FIG. 1 is a front elevation view of the fitment portion of the dual use decorating device of the present invention;

FIG. 2 is a side elevation view of the fitment of FIG. 1;

FIG. 3 is a bottom plan view of the fitment of FIG. 1;

FIG. 4 is a top plan view of the fitment of FIG. 1;

FIG. 10 is an isometric view of an icing pouch including the dual use decorating device of the present invention presented in FIGS. 1–9 with the nozzle cap positioned on the fitment; and FIG. 11 is an isometric view of the pouch of FIG. 10 enclosed within envelope packaging.

DETAILED DESCRIPTION

Figure 8:
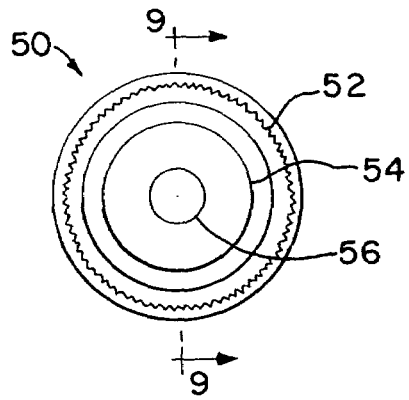
FIG. 8 is a top view of the cap of FIG. 7.
Figure 9:
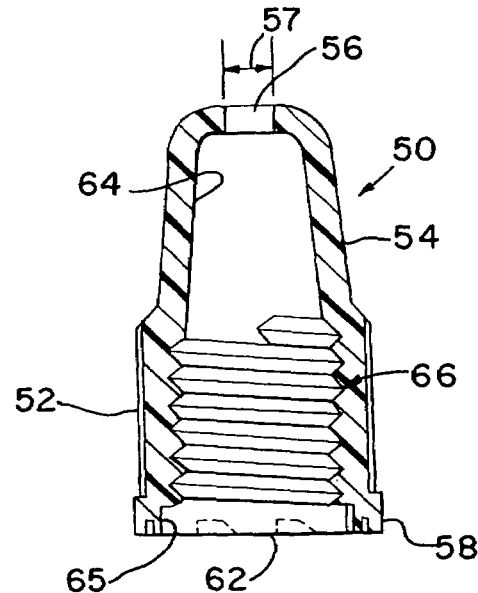
FIG. 9 is a sectional view of the cap of FIG. 8 taken substantially along line 9—9.

The dual use decorating device of the present invention includes a fitment disposed within a container or pouch and a nozzle cap secured to the fitment. The fitment portion is illustrated in FIGS. 1–6 while the nozzle cap is illustrated in FIGS. 7–9.

As shown in FIGS. 1–4, a fitment of the dual use decorating device according to the present invention is indicated in general at 20. In this embodiment, the fitment 20 features a main body 22 having a pair of ears 24a and 24b extending outwardly from the main body 22. Ear 24a extends outwardly from one side of the main body 22 while ear 24b extends outwardly from the opposite side of the main body. As shown in FIGS. 3 and 4, the ears 24a, 24b have a triangular shape. The ears may also be formed from other shapes, such as rectangular or circular. Each ear 24a, 24b preferably includes multiple ridges 26 that extend along the outer surface of each ear. As will be later described, ears 24a and 24b are used to join the fitment 20 to a container, which in the illustrated embodiment is a flexible plastic pouch. Other attachment means may be used for other container types. In other embodiments, the ears 24a and 24b are replaced by other suitable surfaces for welding, gluing or fusing the fitment to the container. Fitment 20 may even be integrally formed with the container.

An annular collar 28 surrounds the main body 22. The annular collar 28 is positioned above the ears 24a, 24b that extend from the main body 22. A stepped shoulder 29 is located at the top of the main body. A neck 32 extends from the stepped shoulder 29 at the top of the main body 22. The neck 32 includes threads 34 on the cylindrical outer wall of the neck. The threads cover approximately one half to one third of the neck, contain three full revolutions and are provided at a pitch of about 1 mm. A tip 36 is located at the top of the neck 32. A passage, defined by an internal surface indicated in phantom at 42 in FIGS. 1, 2 and 5, passes from the bottom of the main body 22, through the main body 22, through the neck 32 and terminates within the tip 36. As a result, the tip 36 is a hollow cone. As illustrated at 43 in FIG. 2, the portion of the passage within the tip 36, as an example only, may have an average diameter of around 2.5 mm. The size of the passage within the tip 36, however, may vary to accommodate different substance viscosities and the users decorating requirements.

Figure 5:
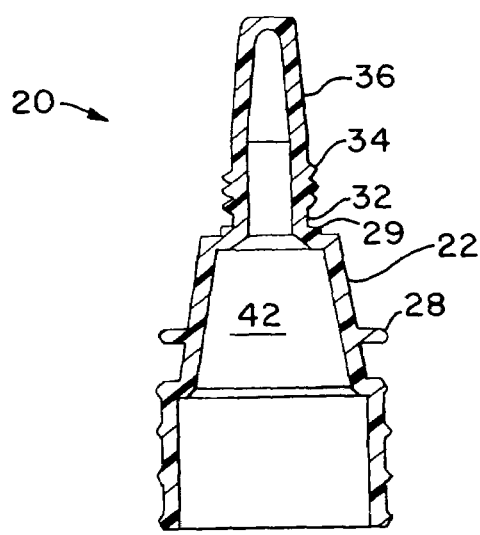
FIG. 5 is sectional view of the fitment taken substantially along line 5—5 of FIG. 4.
Figure 6:
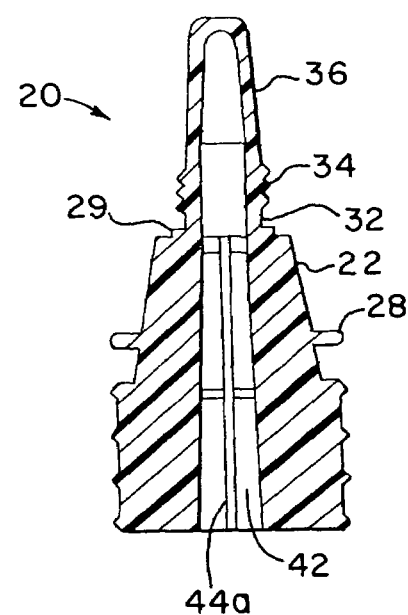
FIG. 6 is a sectional view of the fitment taken substantially along line 6—6 of FIG. 4.
Figure 7:
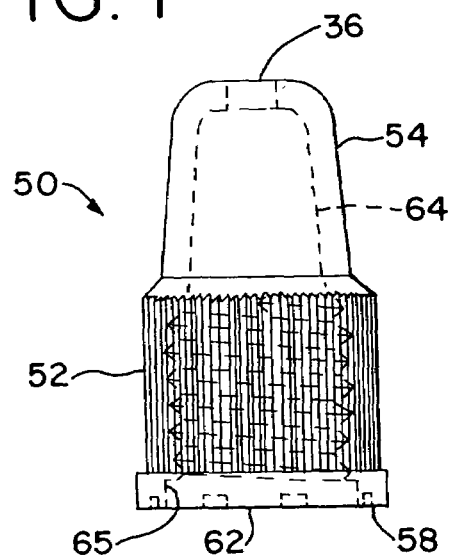
FIG. 7 is a side elevation view of the cap portion of the dual use decorating device of the present invention.

As illustrated in FIGS. 3 and 6, wings 44a–44d extend into the passage of the fitment 20. The wings extend the length of the passage from the bottom to the top of the main body of the fitment. The wings provide support to the inner surface of the main body of the fitment. The wings 44a–44d also prevent multiple fitments from engaging one another and nesting inside each other during manufacturing, transport and storage of the fitment portion of the device.

The nozzle cap that is compatible with the fitment of FIGS. 1–6 is indicated in general at 50 in FIGS. 7–9. The nozzle cap preferably includes a ribbed gripping portion 52 and a smooth dome portion 54. An aperture or opening 56 is formed in the peak of the dome portion 54. The diameter of the aperture, indicated at 57 in FIG. 9, may be, as an example only, approximately 1.8 mm. As with the passage within the fitment tip 36, the diameter 57 of the nozzle cap may vary to accommodate the users decorating requirements. Preferably the cap aperture has a diameter which is smaller than the smallest user-selectable fitment opening made by cutting. While the illustrated cap is circular and will extrude a cylinder, other shapes, such as stars, polygons etc., could be used instead.

The nozzle cap 50 also features a bottom 58 having an opening 62. A passage, defined by an inside surface indicated in phantom at 64 in FIG. 7, passes through the nozzle cap 50 and connects the aperture 56 at the peak of the dome portion 54 to bottom opening 62 of the nozzle cap. A stepped indented surface 65 is located in the inside surface near the bottom opening 62 of the cap 50. The stepped indented surface 65 is designed to matingly engage the stepped shoulder 29 of the fitment 20.

As illustrated in FIG. 9, threads 66 are formed in the cylindrical inside surface 64 of the nozzle cap. These threads 66 are compatible with the threads 34 of the fitment illustrated in FIGS. 1–6. As illustrated in FIG. 10, the threads 66 are used to secure the nozzle cap 50 to the fitment 20 in a removable fashion. As the cap 50 is screwed on to the fitment 20, the stepped indented surface of the cap engages the stepped shoulder 29 of the fitment 20. This connection between the stepped shoulder of the fitment and the stepped indented surface of the cap forms a seal between the bottom of the cap and the main body of the fitment to prevent the excess viscous substance for oozing out of the bottom of the cap. It should be noted that while mating threads on the cap and fitment are illustrated and described below, the threads could optionally be eliminated and the connection could be formed by a notch that matingly engages a groove.

The fitment and the nozzle cap of the present invention are preferably molded from polypropylene. Alternative types of plastics, however, may be used to mold the fitment and nozzle cap. A plastic should be chosen which has a low coefficient of friction and is acceptable for use to contain food stuffs.

As illustrated in FIG. 10, in the illustrated embodiment the fitment 20 of the dual use decorating device is secured to a container or collapsible pouch 70 that is filled with viscous foodstuff, such as icing. While a pouch of icing is illustrated and described, it should be understood that the present invention may be used with pouches of alternative foodstuffs such as frosting, cheese or the like.

The pouch 70 is preferably constructed of a nylon-polypropylene laminate, such as LIQUIFLUX grade from Curwood, Inc. of Oshkosh, Wis. As illustrated in FIG. 10, the ears 24a and 24b of the fitment 20 are secured to the inner surface of the pouch, preferably by sonic fusing. More specifically, with sonic fusing, a portion of the pouch surrounds the ears 24a, 24b of the main body 22 of the fitment. The portion of the pouch surrounding the ears 24a, 24b is melted such that the pouch 70 melts around the ears 24a, 24b and the ridges 26 of the main body 22 to bond the pouch 70 to the ears 24a, 24b of the main body 22. The ridges 26 provide additional surface area for the pouch to adhere to as it melts. Thus, the ridges help bond the pouch to the fitment.

After the fitment 20 has been secured to the pouch 70, the pouch 70 is preferably placed within an envelope packaging, illustrated at 72 in FIG. 11. The envelope packaging 72 of FIG. 11 is preferably made from cardboard or chipboard and features an opening 74 in its bottom panel 76. The envelope packaging also includes a hang hole 78 by which the product may be hung at a display or fixture in a store.

The opening 74 of envelope packaging 72 has a diameter that is larger than the diameter of the main body 22 of the fitment 20, indicated at 82 in FIG. 2, but smaller than the diameter of the collar 28 adhered to the fitment 20, indicated at 84 in FIG. 4. The portion of the main body 22 of the fitment 20 between the collar 28 and the ears 24a and 24b (indicated at 86 in FIG. 1) is positioned within the opening 74 so that the collar 28, the remaining portion of the main body 22, the neck 32 and the nozzle cap 50 extend outside of the envelope packaging 72. As a result, the collar 28 prevents the main body 22 and the neck 32 of the fitment and nozzle cap 50 from being pulled into the envelope packaging.

It should also be recognized that the fitment of the dual use decorating device may be used with other types of containers. For example, the fitment may be used with cylindrical structures such as a caulking container or with a flexible plastic container such as a toothpaste tube. The fitment could also be used with pressurized containers, such as the type of container used to dispense whipped cream.

While the use of the device of the present invention will be described in terms of decorating a cookie with icing, it is to be understood that it may be used to decorate other types of pastries or cakes or other types of food items with a variety of viscous foodstuffs.

When a user purchases the package of prepared icing with the dual use decorating device secured therein, as illustrate in FIG. 11, the nozzle cap 50 is screwed onto the fitment 20 outside of the packaging. As illustrated in FIGS. 1, 2, 5 and 6, the tip 36 of the fitment 20 is initially sealed so that the passage through the fitment is initially closed. As a result, the pouch 70 is sealed so that the icing therein stays fresh. The sealed tip 36 of the fitment 20 also serves as a tamper evident protector for the icing product inside.

To decorate a cookie, the user first removes the nozzle cap 50 from the fitment 20. The user then cuts the tip 36 of the fitment at a preselected point as indicated by dashed line 88 in FIG. 1. Given that the fitment is constructed of plastic, the tip may be cut with scissors or a knife. The icing may then be dispensed through the resulting opening by squeezing the pouch 70 (FIG. 10) and/or envelope packaging 72 (FIG. 11) if the pouch has not been removed from the packaging. Given the somewhat large size of the opening of the tip 36 formed in the fitment 20, the icing is dispense with a substantial first thickness. As a result, the cookie may be covered with wide strips of icing or the cookie may be iced smooth. In other words, the cookie is flooded with icing so as to form a base layer.

The nozzle cap 50 may then be screwed onto the fitment 20. The smaller aperture 56 of the nozzle cap 50 allows the nozzle cap 50 to serve as a decorating tip and dispense icing from the small aperture. The icing dispensed from the small aperture has a second thickness that is smaller than the icing dispensed from the top of the fitment. Thus, the nozzle cap enables the user to create intricate decorative icing designs on top of the previously placed smooth icing base layer.

When the icing of the cookie or other baked good is completed, the nozzle cap may be removed and the above process repeated for the next cookie.

As a result, the dual use decorating device of the present invention offers increased utility and flexibility in dispensing the icing on a baked good. For example, if multiple products of the type illustrated in FIG. 11 are purchased in a variety of icing colors, a wide variety of colorful decorative icing combinations may be produced on the baked goods. The colors used to form the base layers with cut fitment tips 36 may be alternated. The nozzle caps 50 may be positioned on the fitment to enable the user to form patterns or designs with the remaining colors of icing on top of the base layers of icing.

While the preferred embodiments of the invention have been shown and described, it will be apparent to those skilled in the art that changes and modifications may be made therein without departing from the spirit of the invention, the scope of which is defined by the appended claims.

What is claimed is:

1. A container for dispensing a viscous fluid foodstuff, the container comprising:
   a container body having an opening and adapted to contain foodstuff in the form of a viscous fluid;
   a nozzle having a body sealed to the container body so as to surround the container opening, said nozzle body featuring a cylindrical neck including threads formed on an exterior surface of the neck;
   a sealed conical tip of the nozzle extending from and integrally formed with the nozzle body neck adaptable to be opened by an end user to extrude therethrough a stream of viscous fluid foodstuff of a first thickness; and
   a cap featuring a cylindrical inside surface upon which threads are formed, said cap removably secured to the sealed tip of the nozzle via engagement of the threads of said cap with the threads of the nozzle body neck, the cap having an opening permitting the extrusion of a stream of viscous fluid foodstuff therethrough at a second thickness that is less than the first thickness.

2. The container of claim 1, wherein at least a portion of the container body is flexible, the end user pressurizing the viscous fluid foodstuff by applying pressure to said portion of the container body.

3. The container of claim 1, wherein the first thickness is preselected by the end user.

4. The container of claim 3, wherein the tip of the nozzle is a hollow cone, the end user preselecting the first thickness by cutting through the nozzle tip at a selected point on the cone.

5. The container of claim 1, wherein the opening in the cap is circular.

6. The container of claim 1, wherein the nozzle has a stepped shoulder and the cap has a stepped indentation, wherein when the cap is secured to the sealed tip, the stepped shoulder engages the stepped indentation to form a seal between the cap and the nozzle.

7. The container of claim 1, wherein the body has outwardly extending ears.

8. The container of claim 7, wherein the outwardly extending ears have an outer surface with ridges.

9. The container of claim 1, wherein the body has an annular collar for preventing the nozzle from entering the opening in the container body.

10. The container of claim 1, wherein the cap has a gripping portion for facilitating removal of the cap.

11. A dispensing device for dispensing a viscous fluid from a container, the device comprising:
   a nozzle having a body featuring a cylindrical neck including threads formed on an exterior surface of the neck;
   a sealed conical tip extending from and integrally formed with the nozzle body neck adaptable to be opened by an end user to extrude therethrough a stream of viscous fluid of a first thickness; and a cap featuring a cylindrical inside surface upon which threads are formed, said cap removably secured to the sealed tip via engagement of the threads of said cap with the threads of the nozzle body neck, the cap having an opening permitting the extrusion of a stream of viscous fluid therethrough at a second thickness that is less than the first thickness.

12. The dispensing device of claim 11, wherein the first thickness is preselected by the end user.

13. The dispensing device of claim 12, wherein the tip of the nozzle is a hollow cone, the end user preselecting the first thickness by cutting through the nozzle tip at a selected point on the cone.

14. The dispensing device of claim 11, wherein the fastening element of the cap and the fastening element of the nozzle are threads.

15. The dispensing device of claim 11, wherein the opening in the cap is circular.

16. The dispensing device of claim 11, wherein the nozzle has a stepped shoulder and the cap has a stepped indentation, when the cap is secured to the sealed tip, the stepped shoulder engages the stepped indentation to form a seal between the cap and the nozzle.

17. The dispensing device of claim 11, wherein the body has outwardly extending ears.

18. The dispensing device of claim 17, wherein the outwardly extending ears have an outer surface with ridges.

19. A method for dispensing a viscous fluid from a container having a nozzle with a sealed tip and a cap removably secured to the nozzle, the method comprising the steps of:

selecting a first thickness to dispense the viscous fluid from the container;

opening the sealed tip so that it features the selected first thickness;

applying the fluid at the first thickness;

securing the cap to the container; and applying the fluid at a second thickness that is less than the first thickness.

20. The method of claim 19, wherein the step of selecting a first thickness includes cutting through the nozzle tip at a preselected point on the nozzle.

* * * * *